United States Patent

Glynn et al.

(10) Patent No.: US 6,884,026 B2
(45) Date of Patent: Apr. 26, 2005

(54) TURBINE ENGINE SHROUD ASSEMBLY INCLUDING AXIALLY FLOATING SHROUD SEGMENT

(75) Inventors: Christopher Charles Glynn, Hamilton, OH (US); Mary Ellen Alford, Cincinnati, OH (US); Mark Eugene Noe, Morrow, OH (US); Toby George Darkins, Jr., Loveland, OH (US)

(73) Assignee: General Electric Company, Schenectady, NY (US)

( * ) Notice: Subject to any disclaimer, the term of this patent is extended or adjusted under 35 U.S.C. 154(b) by 51 days.

(21) Appl. No.: 10/260,478

(22) Filed: Sep. 30, 2002

(65) Prior Publication Data

US 2004/0062639 A1 Apr. 1, 2004

(51) Int. Cl.⁷ .......................... F04D 29/08; F04D 29/44; F01D 11/08
(52) U.S. Cl. ................. 415/173.1; 415/173.3; 415/209.3; 415/113; 415/139
(58) Field of Search .................. 415/173.1, 173.3, 415/134, 200, 113, 136, 138, 139, 208.3, 173.2, 209.3

(56) References Cited

U.S. PATENT DOCUMENTS

| 3,798,899 | A | | 3/1974 | Hill ........................ 415/173.3 |
| 3,807,891 | A | | 4/1974 | McDow et al. |
| 3,966,353 | A | | 6/1976 | Bodher, Jr. et al. |
| 4,087,199 | A | * | 5/1978 | Hemsworth et al. ..... 415/173.3 |
| 4,193,738 | A | | 3/1980 | Landis, Jr. et al. |
| 4,325,647 | A | | 4/1982 | Maier et al. |
| 4,472,108 | A | * | 9/1984 | Pask .......................... 415/113 |
| 4,683,716 | A | * | 8/1987 | Wright et al. ............ 415/173.2 |
| 4,768,924 | A | | 9/1988 | Carrier et al. |
| 4,988,266 | A | * | 1/1991 | Nakamura et al. ....... 415/173.1 |
| 5,071,313 | A | | 12/1991 | Nichols .................... 415/173.3 |
| 5,074,748 | A | | 12/1991 | Hagle |
| 5,127,793 | A | | 7/1992 | Walker et al. ............ 415/173.1 |
| 5,129,783 | A | | 7/1992 | Hayton .................... 415/209.3 |
| 5,181,827 | A | * | 1/1993 | Pellow et al. ............. 415/173.3 |
| 5,380,150 | A | * | 1/1995 | Stahl .......................... 415/139 |
| 5,388,962 | A | | 2/1995 | Wygle et al. |
| 5,441,385 | A | * | 8/1995 | Boyd et al. ............... 415/209.3 |
| 5,562,408 | A | | 10/1996 | Proctor et al. ........... 415/173.1 |
| 5,591,003 | A | * | 1/1997 | Boyd et al. ............... 415/209.3 |
| 6,000,906 | A | | 12/1999 | Draskovich ................ 415/200 |
| 6,062,813 | A | * | 5/2000 | Halliwell et al. ......... 415/173.1 |
| 6,113,349 | A | * | 9/2000 | Bagepalli et al. ......... 415/173.1 |
| 6,142,734 | A | | 11/2000 | Lee |
| 6,241,471 | B1 | * | 6/2001 | Herron ..................... 415/173.1 |
| 6,435,824 | B1 | * | 8/2002 | Schell et al. ................ 415/200 |
| 6,702,550 | B1 | * | 3/2004 | Darkins et al. ........... 415/173.1 |
| 2003/0133790 | A1 | * | 7/2003 | Darkins et al. ............. 415/139 |
| 2003/0185674 | A1 | * | 10/2003 | Alford et al. ............. 415/173.1 |

FOREIGN PATENT DOCUMENTS

GB            1368770 A  * 10/1974    ............. F01D/9/02

* cited by examiner

Primary Examiner—Thai-Ba Trieu
(74) Attorney, Agent, or Firm—David L. Narciso; Lee H. Sachs

(57) ABSTRACT

At least one shroud segment, floating axially independently of adjacent turbine engine shroud assembly members, includes a segment body comprising a radially outer surface and a radially outwardly projecting segment support that includes an axial support wall surface therein. The assembly includes a shroud hanger in axial juxtaposition with the segment support, and at least one axial support projection from the shroud hanger into the segment support at the support wall surface. The support projection supports the shroud segment releasably at the support wall surface sufficiently to enable relative axial movement of the shroud segment on the support projection independently of the shroud hanger and adjacent engine members.

23 Claims, 4 Drawing Sheets

TURBINE ENGINE SHROUD ASSEMBLY INCLUDING AXIALLY FLOATING SHROUD SEGMENT

The Government has rights in this invention pursuant to Contract No. F33615-97-C-2778 awarded by the Department of Air Force.

BACKGROUND OF THE INVENTION

This invention relates generally to turbine engine articles disposed about rotating articles, for example a turbine shroud, including a surface exposed to elevated temperature engine gas flow, and to their assemblies about rotating blades. More particularly, it relates to air cooled gas turbine engine shroud segments and to shroud assemblies, for example used in the turbine section of a gas turbine engine, especially segments made of a low ductility material.

Typically, a plurality of gas turbine engine stationary shroud segments assembled circumferentially about an axial flow engine axis and radially outwardly about rotating blading members, for example about turbine blades, defines a part of the radial outer flowpath boundary over the blades. As has been described in various forms in the gas turbine engine art, it is desirable to maintain the operating clearance between the tips of the rotating blades and the cooperating, juxtaposed surface of stationary shroud segments as close as possible to enhance engine operating efficiency. Some examples of U.S. patents relating to turbine engine shrouds and such shroud clearance include U.S. Pat. No. 3,798,899—Hill; U.S. Pat. No. 3,807,891—McDow et al.; U.S. Pat. No. 5,071,313—Nichols; U.S. Pat. No. 5,074,748—Hagle; U.S. Pat. No. 5,127,793—Walker et al.; and U.S. Pat. No. 5,562,408—Proctor et al.

Metallic type materials currently and typically used as shrouds and shroud segments have mechanical properties including strength and ductility sufficiently high to enable the shrouds to be restrained against typical movement, deflection and/or distortion resulting from thermal gradients and other pressure forces known to occur in operation of a turbine engine without detrimental effect on the shroud material. Examples of such restraint include the well known side rail type of structure, or the C-clip type of sealing structure, for example described in the above identified Walker et al patent. That kind of restraint and sealing results in application of a compressive force at least to one end of the shroud to inhibit chording or other distortion. Other patents, such as the above-identified McDow et al. patent, describe radial clearance control between juxtaposed engine members such as rotating blades and surrounding stationary structure aerodynamically loaded against each other during engine operation. Such active radial clearance control is responsive to changes in temperature during engine operation. In some of such patents, for example the McDow et al. patent, description is included for a partial axial movement of an entire assembly of adjacent, juxtaposed, contacting engine members, for example the assembly of adjacent stationary turbine vanes and juxtaposed or intermediate shrouds held in contact therewith. Such axial movement, that occurs as a result of adjacent members applying pressure on an adjacent member such as a shroud during engine operation, can result in application of significant pressure to a shroud or shroud segment.

Current gas turbine engine development has suggested, for use in higher temperature applications such as shroud segments and other components, certain materials having a higher temperature capability than the metallic type materials currently in use. However such materials, forms of which are referred to commercially as a ceramic matrix composite (CMC), have mechanical properties that must be considered during design and application of an article such as a shroud segment. For example, as discussed below, CMC type materials have relatively low tensile ductility or low strain to failure when compared with metallic materials. Also, CMC type materials have a coefficient of thermal expansion (CTE) in the range of about 1.5–5 microinch/inch/° F., significantly different from commercial metal alloys used as restraining supports or hangers for shrouds of CMC type materials. Such metal alloys typically have a CTE in the range of about 7–10 microinch/inch/° F. Therefore, if a CMC type of shroud segment is restrained or axially loaded during engine operation, and cooled on one surface as is typical during operation, compressive forces can be developed in a CMC type segment sufficient to cause failure of the segment.

Generally, commercially available CMC materials include a ceramic type fiber for example SiC, forms of which are coated with a compliant material such as BN. The fibers are carried in a ceramic type matrix, one form of which is SiC. Typically, CMC type materials have a room temperature tensile ductility of no greater than about 1%, herein used to define and mean a low ductility material. Generally CMC type materials have a room temperature tensile ductility in the range of about 0.4–0.7%. This is compared with metallic shroud and/or supporting structure or hanger materials having a room temperature tensile ductility of at least about 5%, for example in the range of about 5–15%. Shroud segments made from CMC type materials, although having certain higher temperature capabilities than those of a metallic type material, cannot tolerate the above described and currently used type of compressive force or similar restraint force against chording. Neither can they withstand a stress rising type of feature, for example one provided at a relatively small bent or filleted surface area, without sustaining damage or fracture typically experienced by ceramic type materials. Furthermore, manufacture of articles from CMC materials limits the bending of the SiC fibers about such a relatively tight fillet to avoid fracture of the relatively brittle ceramic type fibers in the ceramic matrix. Provision of a shroud segment assembly, in one embodiment including shroud segments of such a low ductility material, floating axially independently of other engine members and positioned or disposed in a manner that does not apply detrimental force to the shroud segment during operation would enable advantageous use of the higher temperature capability of CMC material for that purpose.

BRIEF SUMMARY OF THE INVENTION

Forms of the present invention provide a turbine engine shroud assembly comprising at least one shroud segment floating axially independently of other engine members disposed in adjacent juxtaposition with the shroud segment. In one embodiment, the shroud assembly includes at least one shroud segment, and generally a plurality of segments, including therein a shroud segment support wall surface extending generally axially into and at least partially through the segment. In that embodiment, the shroud assembly includes a shroud hanger disposed in axial juxtaposition with the shroud segment and having at least one support projection secured with the shroud hanger. The projection, that can be in the form of a pin, extends generally axially from the shroud hanger into the shroud segment at the shroud segment support wall surface, supporting the shroud segment releasably at the shroud segment support wall surface within the shroud segment. Accordingly, the shroud segment is movable and floats axially on the projection independently of the shroud hanger and other engine members in adjacent juxtaposition with the shroud segment.

Another form of the present invention provides a turbine engine shroud segment, for example for mounting in a shroud assembly including a stationary article hanger. The shroud segment comprises a shroud segment body including a shroud segment body radially inner surface, and a shroud segment body generally radially outer surface. In addition, the shroud segment includes at least one shroud segment support, for example a support rib, secured with the shroud segment body for carrying the shroud segment body. The shroud segment support, which can be integral with the body, projects generally radially outwardly from the body radially outer surface. The shroud segment support includes therein a support wall surface extending generally axially into and at least partially through the segment support.

DETAILED DESCRIPTION OF THE INVENTION

The present invention will be described in connection with an axial flow gas turbine engine for example of the general type shown and described in the above identified Proctor et al patent. Such an engine comprises a plurality of cooperating engine members and their sections in serial flow communication generally from forward to aft, including one or more compressors, a combustion section, and one or more turbine sections disposed axisymmetrically about a longitudinal engine axis. Accordingly, as used herein, phrases using the term "axially", for example "axially forward" and "axially aft", are directions of relative positions in respect to the engine axis; phrases using forms of the term "circumferential" refer to circumferential disposition generally about the engine axis; and phrases using forms of the term "radial", for example "radially inner" and "radially outer", refer to relative radial disposition generally from the engine axis.

It has been determined to be desirable to use low ductility materials, such as the above-described CMC type materials, for selected articles or components of advanced gas turbine engines, for example non-rotating turbine shroud segments. However, because of the relative brittle nature of such materials, conventional mechanisms currently used for attaching metallic forms of such components to the engine structure cannot be used: relatively high mechanical, thermal and contact stresses can result in fracture of the brittle materials. Forms of the present invention provide article configurations and mechanisms for carrying articles or components made of such brittle materials in a manner that avoids application of undesirable stresses to the article.

Forms of the present invention will be described in connection with an article in the form of a gas turbine engine turbine shroud segment, made of a low ductility material, and a shroud assembly. The fragmentary, partially sectional perspective view of FIG. 1 includes a shroud segment shown generally at 10 made of a CMC material. In the embodiments of the drawings, orientation of shroud segment 10 in a turbine engine is shown by engine direction arrows 12, 14, and 16 representing, respectively, the engine circumferential, axial, and radial directions.

Figure 1:
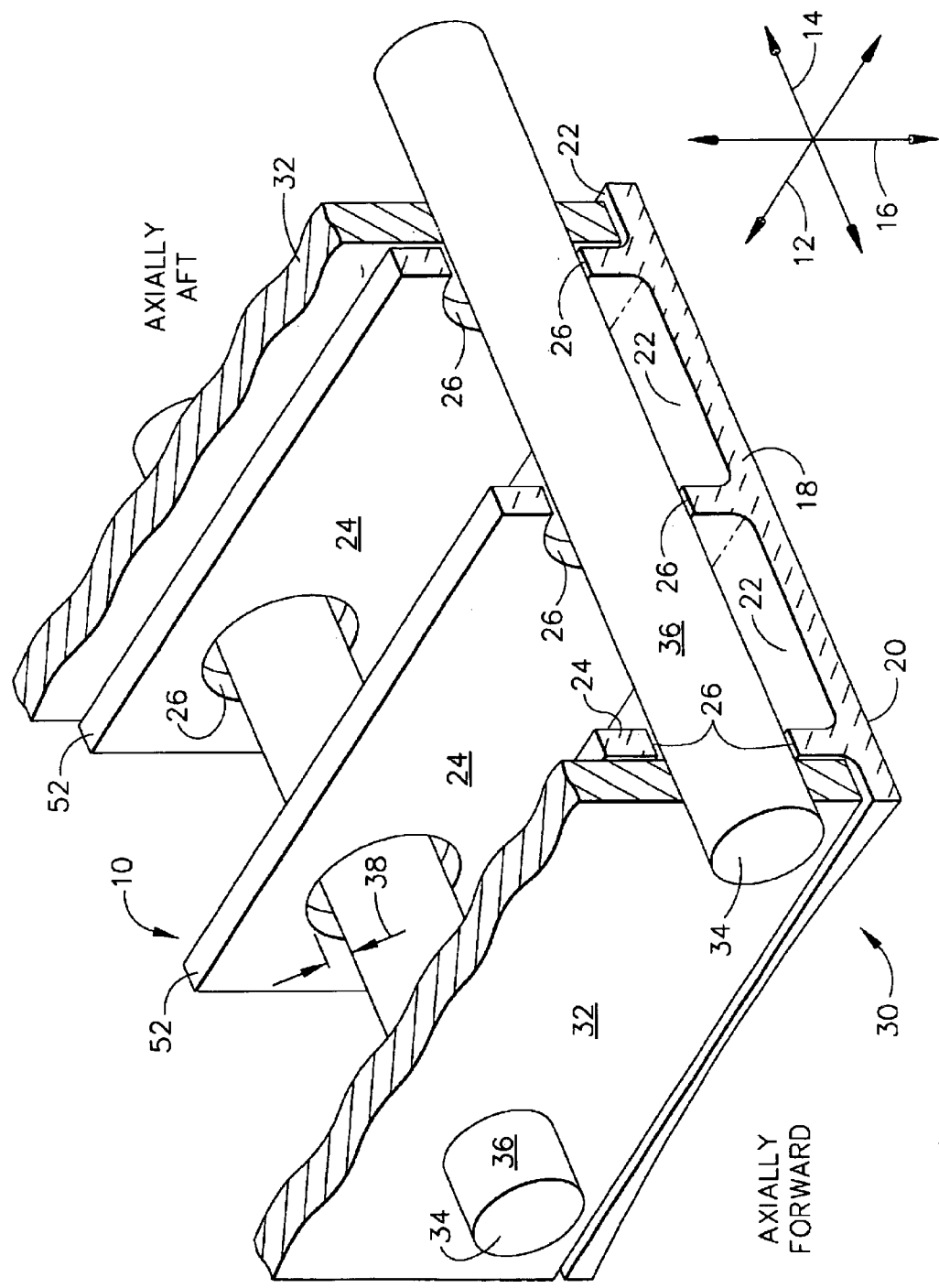
FIG. 1 is a fragmentary, partially sectional perspective view of a portion of a turbine engine shroud assembly showing one embodiment including a plurality of shroud segment supports in the form of support projections or pins disposed through spaced apart shroud segment ribs and juxtaposed hanger ribs.

Shroud segment 10 includes a shroud body 18 having body radially inner surface 20 and a body radially outer surface 22. Shroud body 18 includes at least one shroud segment support rib 24, two of which are shown in the embodiment of FIG. 1, integral with and carrying shroud body 18. In one embodiment of FIG. 1, shroud segment 10, including shroud body 18 and support ribs 24, is extruded as an integral member, with radially inner surface 20 being machined to provide an arcuate engine flowpath. Therefore as shown, the radial thickness of shroud body 18 varies in the circumferential direction. In other embodiments, the entire shroud segment can be made or formed arcuate. In that example, the radial thickness of shroud body 18 is substantially constant. In FIG. 1, ribs 24 project generally radially outwardly from and are disposed generally circumferentially along radially outer surface 22 of shroud body 18. Included at least partially axially into ribs 24 is a plurality of spaced apart radially arcuate support wall surfaces 26. In this embodiment, support wall surface 26 is generally axially through the rib, defining an arcuate passage or hole 28 through support ribs 24. Such passages 28 are shown more clearly in the diagrammatic side view of FIG. 3.

Figure 2:
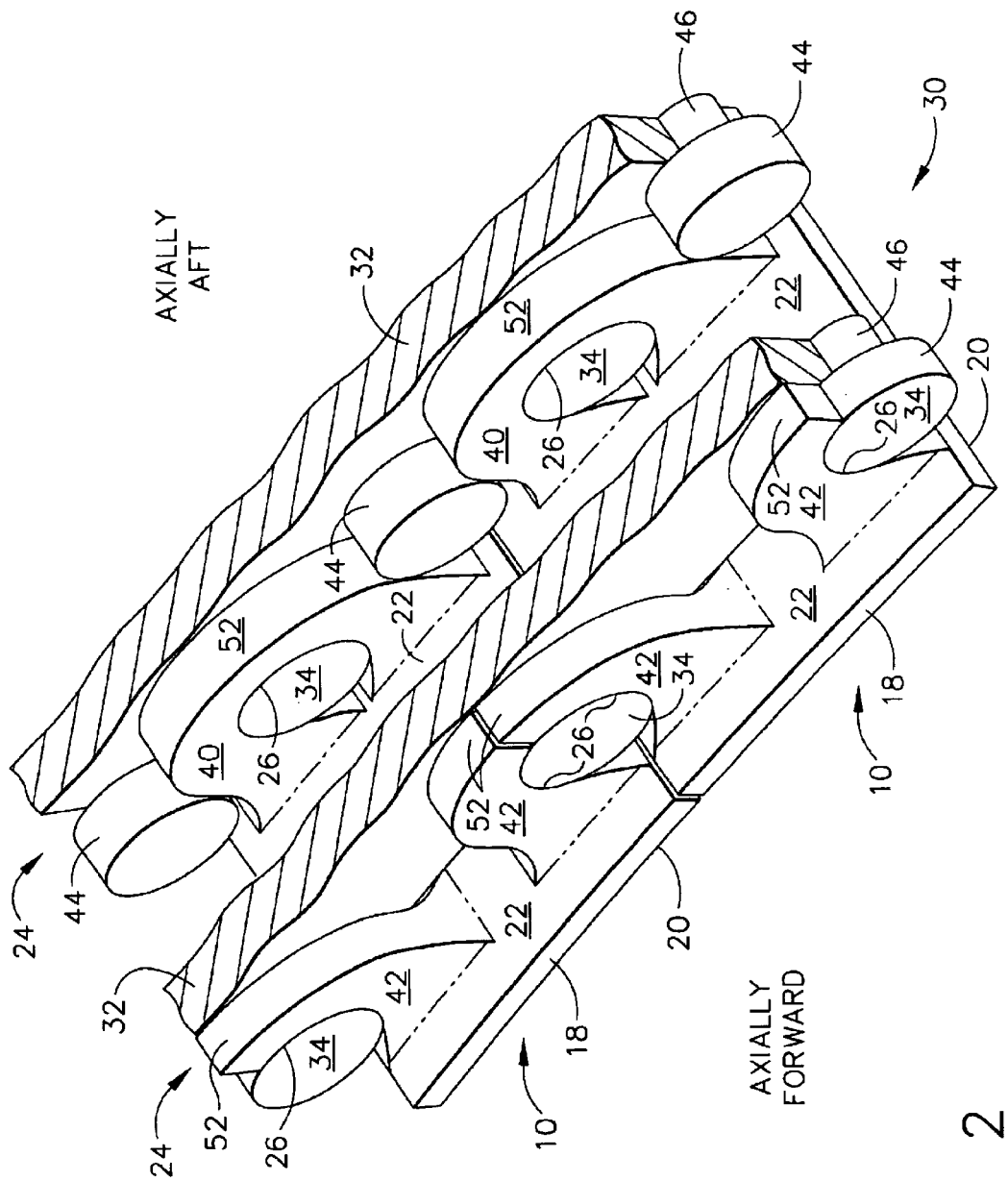
FIG. 2 is a partially sectional perspective view of an embodiment including two shroud segments of a turbine engine shroud assembly in which a pair of shroud segment ribs each comprises a plurality of spaced apart rib segments in juxtaposition with an associated juxtaposed hanger rib, the assembly including a plurality of stepped support pins held by the hanger ribs and supporting the shroud segment through the shroud segment rib segments.

FIGS. 1 and 2 show a turbine engine shroud assembly generally at 30 comprising, typical of the art, a plurality of the shroud segments 10, one of which is shown in FIG. 1 and two of which are shown in FIG. 2, assembled in juxtaposition circumferentially. In the present invention embodiment of FIG. 1, shroud segments 10 are assembled with a stationary shroud hanger 32, shown to be metallic but which can be of another material such as a CMC material, secured with and held stationary by an engine frame (not shown). Assembly 30 includes at least one metallic axial shroud segment support projection or support pin 34. As used herein, the term "projection", a form of which is a pin, is intended to include within its meaning a support member of selected cross sectional configuration extending axially from and secured with or integral with a part of hanger 32 in a releasable relationship with shroud segment 10. In the embodiments of the drawings in which shroud segment 10 is made of a CMC material, projection or pin 34 comprises an arcuate outer surface 36 for cooperation in juxtaposition with a cooperating segment arcuate support wall surface 26 extending through rib 24.

Pin 34 is held by hanger 32, for example firmly through an interference type fit between cooperating surfaces of the pin and of the hanger. However, pin 34 supports shroud segment 10 releasably or relatively loosely in contact at arcuate support wall surfaces 26 to enable shroud segment 10 to move freely or float axially independently of hanger 32, of projections or pins 34, and of adjacent engine members (not shown). Such adjacent engine members can include adjacent stationary turbine vanes and vane outer bands, engine frame members, etc., for example as shown in the above identified Proctor et al. patent.

In FIG. 1, shroud segment 10 is held at arcuate support wall surface 26 through support ribs 24 across a clearance 38 sufficient to enable, in addition to relative axial free floating movement, relative thermal expansion and contraction of metallic pin 34 and CMC support wall surface 26. For example, when shroud segment 10 is made of a CMC material comprising SiC fibers in a SiC matrix and support pin 34 is made of a Ni base superalloy, the clearance or tolerance between support pin surface 36 and cooperating arcuate support wall surface 26 in rib 24 prior to engine operation generally is in the range of about 0.002–0.005 inch. Such assembly avoids, during engine operation, application of detrimental force to support wall surface 26 and in turn to rib 24, for example a stress sufficient to result in damage such as cracking of the CMC material of support rib 24.

Another embodiment of turbine engine shroud segment 10 and shroud assembly 30 of the present invention is shown in the partially sectional perspective view of FIG. 2. Turbine engine shroud assembly shown generally at 30 comprises a plurality of shroud segments, two of which are shown generally at 10. In the embodiment of FIG. 2, each shroud segment 10 includes a pair of radially protruding generally axially disposed shroud support ribs shown generally at 24. Each of the two shroud segments 10 includes one support rib, axially aft of the other segment support rib, and comprising a rib segment 40 generally in an arch or omega shape protruding radially from shroud segment body radially outer surface 22. The other, axially forward, support rib comprises a pair of spaced apart, circumferentially aligned rib segments 42 each generally in the form of oppositely facing hooks protruding radially from shroud segment body radially outer surface 22.

Figure 5:
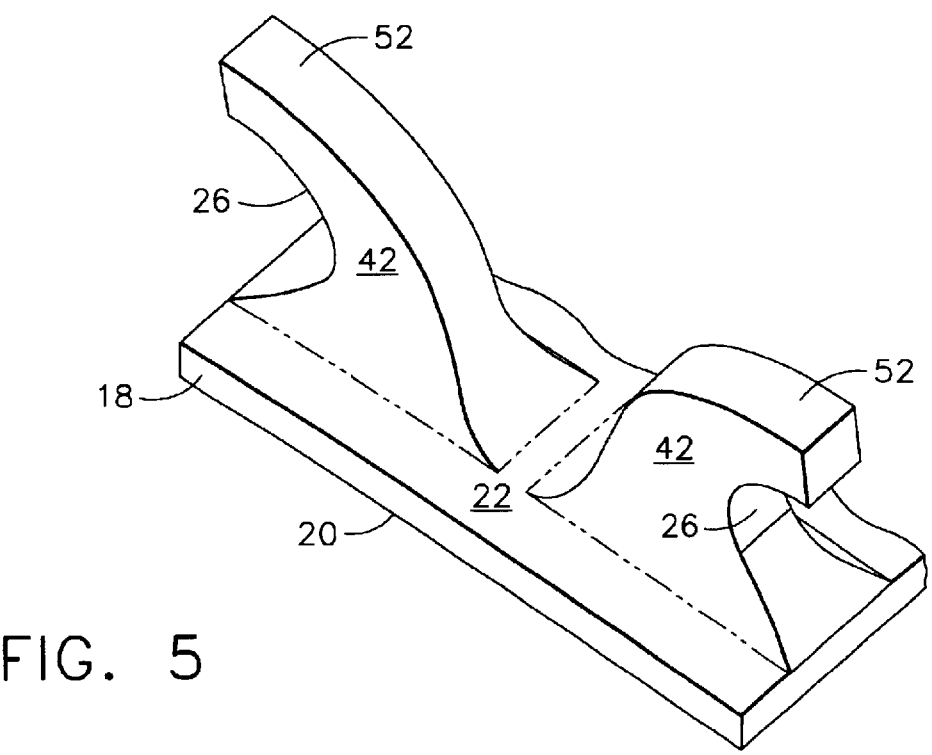
FIG. 5 is a fragmentary perspective view of the axially forward portion of the shroud segment of FIG. 2.

As will be discussed in more detail later in connection with FIG. 5, provision of support ribs 24 as circumferentially disposed segments radially protruding from segment body radially outer surface 22 exposes a portion of such surface 22 between rib segments 40 and 42. Generally, the radially outer portion of shroud segment 10 is exposed to the flow of cooling air, for example in the range of about 1100–1400° F. Concurrently, radially inner surface 20 of shroud segment body 18, operating in the engine flow path, is exposed to relatively high temperatures in the range of about 2500–3000° F. Such a temperature difference radially through segment support rib 24 in the embodiment of FIG. 1, in some engine designs can develop in the support rib a relatively high thermal stress that can damage the structure of a rib made of a low ductility material. Accordingly, separation of support ribs 24 into spaced apart segments, for example 40 and 42 as in FIG. 2, reduces the radial thickness of support rib 24, for example to expose more of radially outer surface 22 of shroud segment body 18, reducing differences in operating temperature between shroud body radially inner surface 20 and radially outer surfaces of shroud segment 10. This reduces potentially damaging thermal stresses through the segment and the supporting rib structure.

In addition to and in combination with such a structure reducing thermal stresses in a shroud segment, embodiments of the present invention provide arcuate shroud segment support surfaces to reduce notch sensitivity at support surface cooperating with a metallic shroud hanger. In each shroud segment 10 in the embodiment of FIG. 2, support rib segments 40 and 42 each include generally axially therethrough an arcuate support wall surface 26. In support rib segments 40, arcuate support wall surfaces 26 define a passage or hole generally axially through the arch-shaped rib segment. In support rib segments 42, arcuate support wall surfaces 26, axially offset from support wall surface 26 of rib segment 40, define an inner surface of segments 42 shaped as hooks circumferentially facing opposite one to the other. Support wall surfaces 26 of circumferentially juxtaposed and oppositely facing hook shaped rib segments 42 cooperate to define therebetween an arcuate passage shaped to receive therein an arcuate support pin 34, shown as a pin of generally circular cross section as a preferred form. In the embodiment of FIG. 2, support pins 34 are stepped pins having a larger head portion 44 and a smaller pin body portion 46.

The assembly of FIG. 2 includes spaced-apart shroud hangers 32, one axially adjacent each of the support ribs 24. Each hanger 32 includes therein openings axially aligned with openings defined by arcuate support wall surfaces 26 through ribs 24 and sized to receive and hold firmly body portion 46 of support pin 34, for example in an interference fit, through cooperating threads, etc. As was discussed above, shroud segment 10 is supported by support pins 34 releasably across the above described clearance or tolerance to enable the shroud segment to float axially independently of other engine structure. Therefore, one assembly method for the embodiment of FIG. 2 is conducted by first disposing support pins 34 with stepped pin body 46 securely in hanger 32, and then slipping arcuate radially inner support wall surfaces 26 of shroud segment 10 axially onto support pin heads 44. However, it should be understood that selected or all radially inner support wall surfaces 26 can extend axially partially into shroud segment 10, such as into rib 24, sufficient to receive support projection or pin 34, for example the stepped-type pin 34 held by support ribs 32 in FIG. 2.

One embodiment of the assembly of shroud segments 10 with shroud hanger 32 is with a plurality of spaced-apart, axially extending support projections or pins 34, for example as in FIG. 1. However, forms of the present invention has recognized that the relative location of support projections or pins 34 with a shroud segment made of a low ductility material such as a CMC material can inhibit thermal deflection of the shroud experienced during engine operation. Generation of excessive stresses by restraining such deflection can result in detrimental damage to such a shroud segment. To obviate such a condition, the present invention provides the above-described, independently axially floating shroud or shroud segment.

Thermal forces tending to deflect a shroud segment can result from a variety of thermal gradient and air/fluid pressure differences to which a shroud segment normally is exposed during engine operation. For example, to enable current materials to operate effectively as a shroud in the strenuous temperature and pressure conditions as exist in the turbine section flowpath of modern gas turbine engines, it has been a practice to provide cooling air to a radially outer portion of the shroud. Thermal differences between radially inner and outer portions of a shroud segment and changes in fluid pressure gradients downstream through the turbine can generate shroud segment deflection or distortion, generally referred to as "chording". Concurrently, deflection or distortion can result from progressively downstream increasing fluid pressure differences between shroud segment cooling air and engine operating stream. Means for holding a shroud segment made of a low ductility material must consider such concurrently acting stresses on the shroud segment during engine operation to avoid shroud material damage from such stresses.

Chording results from a thermal differential or gradient between a higher temperature radially inner shroud surface and a lower temperature, air-cooled shroud outer shroud surface. At least the radially inner or flowpath surface of a shroud and its segments are arced circumferentially to define a flowpath annular surface about the rotating tips of the blades. The thermal gradient between the inner and outer faces of the shroud, resulting from cooling air impingement on the outer surface, causes the arc of the shroud segments to chord or tend to straighten out circumferentially. As a result of chording, the circumferential end portions of the inner surface of the shroud segment tend to move radially outwardly in respect to the middle portion of the segment.

As is well known in the gas turbine engine art, other segment distortion or distortion forces can occur concurrently, for example in a high-pressure turbine. One such type of force is generated by pressure differences acting on a shroud segment as a result of a relatively high cooling air pressure on a radially outer portion of a shroud segment, opposite a lower flow stream pressure which decreases axially downstream through a turbine. That pressure differential tends to distort the shroud segment toward the engine flow path and rotating blade tips.

Figure 3:
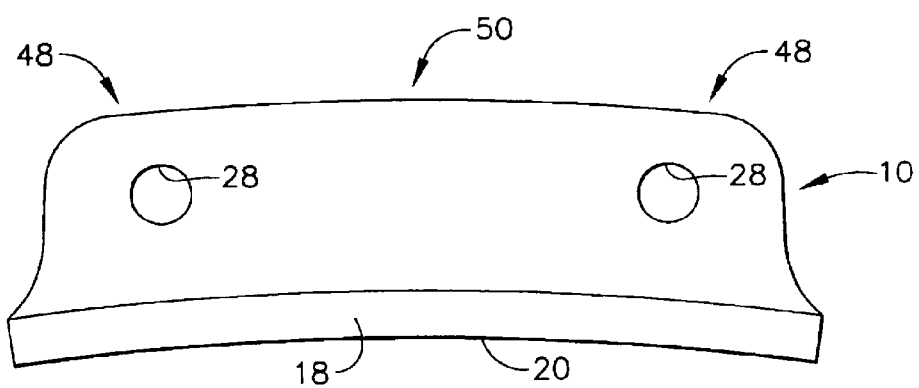
FIG. 3 is a diagrammatic side view of the shroud segment of FIG. 1.
Figure 4:
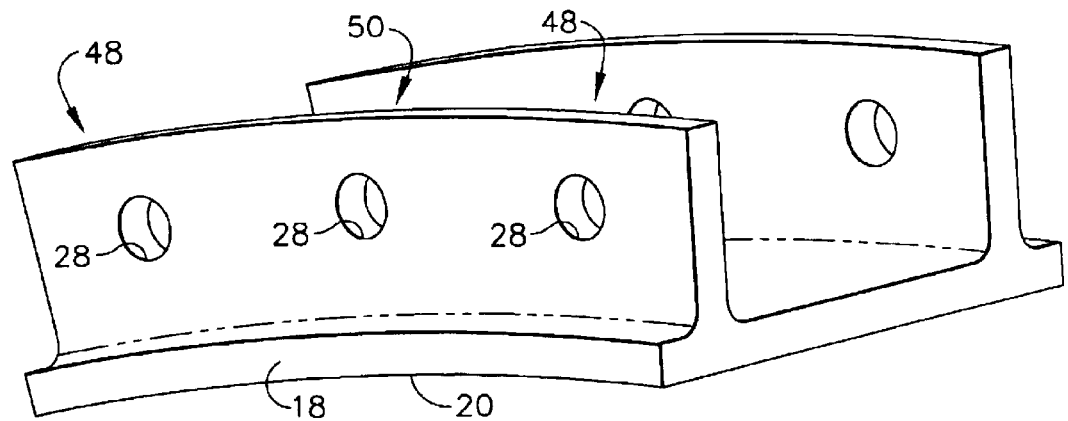
FIG. 4 is a diagrammatic perspective view of a shroud segment of the type shown in FIG. 1 with an undesirable arrangement of shroud segment arcuate support surfaces defining axially extending holes through the shroud segment.

It has been recognized, according to forms of the present invention, that excessive, improper radial restraint in a shroud assembly of a shroud segment made of a low ductility material such as a CMC material can result in generation of detrimental stresses in such a shroud segment from the above-described combination of operating stresses. When projections in the form of pins 34 through support ribs 24 and shroud hanger 32 are used to support a shroud segment in an embodiment as in FIG. 1, restraint at both the circumferential end portions and a mid-portion of the support rib should be avoided when the shroud segment is made of a low ductility material. In FIG. 3, the diagrammatic side view of the general type of shroud segment of FIG. 1 shows a preferred positioning of passages 28 through support rib 24 at circumferentially spaced apart, outboard end portions 48, avoiding circumferential mid-portion 50. In a preferred form of that embodiment, more than one support pin is used to avoid a rocking type rotation of the shroud segment. As was described above, radial thermal deflections across the shroud segment tend to move circumferential end portions 48 particularly in shroud segment body 18 radially outward and mid-portion 50 radially inward. Under such conditions, restraint or "locking down" of mid portion 50 along with restraint of end portions 48, as would occur with the arrangement shown in the diagrammatic perspective view of FIG. 4, could result in large loads on and undesirable damage to shroud segment 10. In addition, such restraint could interfere with designed clearances between circumferentially adjacent shroud segments in a shroud assembly.

As was mentioned above in connection with the embodiment of FIG. 2, providing support ribs 24 as segments 40 or 42, in a manner that reduces the radial thickness of support ribs 24, for example exposing radially outer surfaces 22 between or adjacent segments 40 and 42 can reduce thermal stresses such as tensile stresses in support ribs 24. The fragmentary perspective view of FIG. 5 shows the axially forward portion of a shroud segment 10 of FIG. 2 emphasizing the spacing of support rib segments 42 along, and the exposure of, shroud body radially outer surface 22.

During operation in a turbine engine, it is typical that shroud body radially inner surface 20, in the flow stream of the engine, is exposed to a temperature in the range of about 2500–3000° F. Concurrently, radially outer surface 52 of a substantially continuous support rib 24, FIG. 1, or spaced apart support rib segments 40 and 42, FIG. 2, are bathed in cooling air at a temperature in the range of about 1100–1400° F. In a continuous, unsegmented support rib structure as is shown in FIG. 1, the thermal gradient across the continuous support rib can generate, in some engine designs, a relatively large tensile stress sufficient to result in damage such as cracking of a support rib made of a low ductility material such as a CMC material. For use in such engine designs, a preferred embodiment of the present invention, for example as shown in FIGS. 2 and 5, reduces such a thermal gradient in at least a portion of support rib 24. This is accomplished by providing circumferentially disposed support rib 24 in circumferentially spaced-apart segments, shown as 40 and 42. In such a structure, shroud segment radially outer portion 22 between support rib segments 42, as in FIG. 5, experiences a temperature of about 2000° F., thereby reducing in shroud body 18 the operating thermal gradient between surfaces 20 and 22, and stresses resulting from such gradient.

The embodiment of FIG. 2, including the segmented support ribs for the reasons described above, is a preferred form of the present invention. One feature is the relative axially forward and aft offsetting of the support rib segments to provide a three-point or tripod shroud segment support. Another feature is the combination of relative shapes of the support rib segments that, while providing appropriate support for the shroud segment, avoid relatively sharp junctures between surfaces, thereby avoiding or reducing "stress riser" conditions at such junctures. Included in the structure of FIG. 2 is an axially aft full arc or generally arch or omega shaped support rib segment 40, including a passage or hole therethrough defined by a substantially continuous arcuate support wall surface 26, for greater support because of greater fluid pressure forces acting during operation on the shroud segment axially aft. In combination with the shape and position of support segment 40 are a pair of generally hook shaped segments 42 axially forward of support segment 40 and disposed circumferentially in opposite directions for shroud segment stability. In addition, such positioning of shroud segments 42 enables cooperating hooks 42 of adjacent, juxtaposed shroud segments 10 to define therebetween generally a full arch or arcuate omega shaped support structure in the shroud assembly, to receive therein stepped support pins, as described above.

Figure 6:
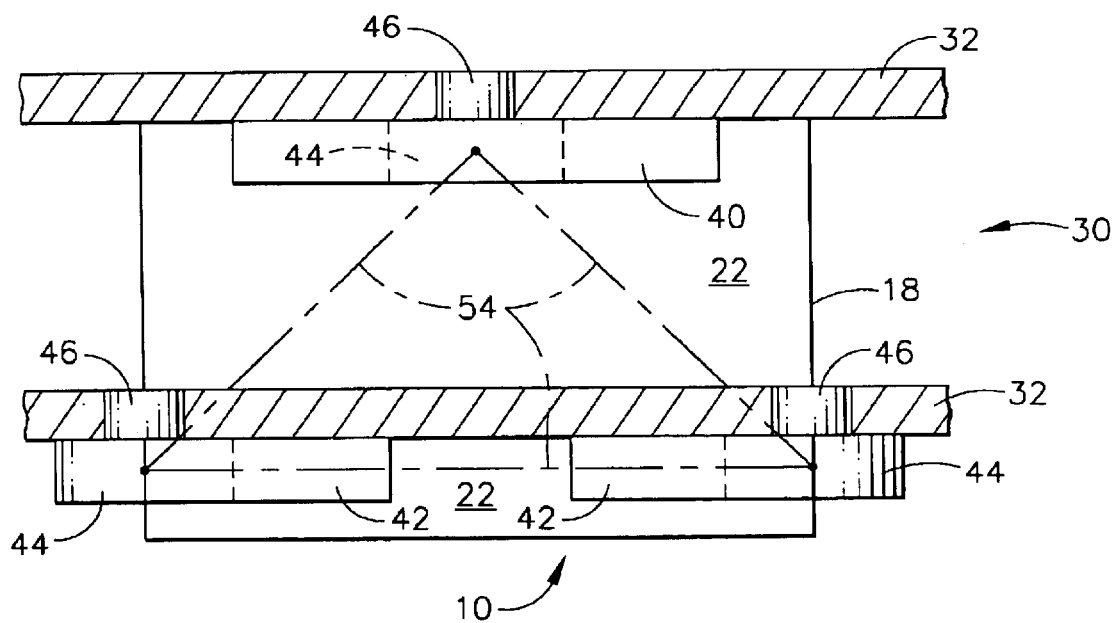
FIG. 6 is a diagrammatic, partially sectional top view of a portion of FIG. 2 showing a three point pinned arrangement with the shroud hanger.

In the shroud segment embodiment of FIG. 6, a single arch shaped support segment 40 is positioned on shroud segment body radially outer surface 22 generally axially aft and circumferentially between a pair of generally hook shaped support rib segments 42. This defines a stable triangular and thermal deflection compliant support between their respective arcuate support surfaces. The diagrammatic, partially sectional view of FIG. 6 is a top view of a portion of FIG. 2 showing one shroud segment 10 and the relative axial and circumferential positions of support rib segment 40 and support rib segments 42. Line 54 represents a triangle between arcuate support wall surfaces 26 of support segment 40 and of support segments 42 showing the stable three-point or tripod support provided to shroud segment 10 in a shroud assembly 30.

Description of the present invention in respect to an independently axially floating shroud has included specific examples, materials and combinations of structures. However, it should be understood that such embodiments are intended to be typical rather than in any way limiting on the scope of the present invention. Those skilled in the various arts involved, such as arts relating to turbine engines, to high temperature metallic and non-metallic materials, and their combination, will understand that the present invention is capable of variations and modifications without departing from the scope of the appended claims.

What is claimed is:

1. A turbine engine shroud segment for assembly circumferentially about an axial flow engine axis, separate and spaced apart from any blading member, the shroud segment comprising a shroud segment body including a radially inner surface arcuate at least circumferentially, a radially outer surface, and at least one shroud segment support integral with the shroud segment body for carrying the shroud segment body, the segment support projecting generally radially outwardly from the shroud segment body radially outer surface, wherein:

the shroud segment is separate and spaced apart from any blading member;

the radially inner surface defines a part of a turbine engine flowpath boundary over rotating blading members; and, the shroud segment support includes therein a support wall surface extending generally axially into and at least partially through the segment support.

2. The shroud segment of claim 1 in which the segment support comprises at least one rib integral with and disposed circumferentially along the shroud segment body radially outer surface.

3. The shroud segment of claim 2 made of a low ductility material having a low tensile ductility, measured at room temperature to be no greater than about 1%.

4. The shroud segment of claim 3 in which the low ductility material is a ceramic matrix composite material.

5. The shroud segment of claim 2 including a plurality of axially spaced apart support ribs each including a radially arcuate wall surface aligned axially with an arcuate wall surface of a spaced apart support rib.

6. The shroud segment of claim 2 including a plurality of axially spaced apart support ribs;

at least a first support rib comprising a plurality of spaced apart support rib segments aligned circumferentially to define the support rib, the support rib segments being spaced circumferentially on the shroud segment body radially outer surface.

7. The shroud segment of claim 6 in which the support rib segments are spaced apart circumferentially on the shroud segment body radially outer surface sufficiently to expose therebetween a portion of the shroud segment body radially outer surface.

8. The shroud segment of claim 6 in which:

the spaced apart support rib segments of the first support rib are hook shaped rib segments each including a radially inner and arcuate support wall surface extending generally axially through the rib segment;

juxtaposed circumferentially spaced apart hook shaped rib segments facing circumferentially opposite one to the other exposing therebetween a portion of the shroud segment body radially outer surface.

9. The shroud segment of claim 8 which includes a second support rib axially spaced apart on shroud segment body radially outer surface aft of the first support rib;

the second support rib comprising a generally arch shaped rib segment extending circumferentially along shroud segment body radially outer surface;

the arcuate support surface of the second support rib segment defining a generally axial passage through the second support rib segment.

10. The shroud segment of claim 9 in which:

the first support rib consists of a pair of the first support hook shaped rib segments; and, the second support rib consists of one arch shaped segment axially aft on the shroud segment body radially outer surface of the first support rib and positioned generally axially aft and circumferentially between the pair of first support rib segments to define a triangle between the arcuate support wall surfaces of the first and second support rib segments.

11. The shroud segment of claim 1 in which the support wall surface defines at least one axial passage through the support rib.

12. A turbine engine shroud assembly comprising at least one shroud segment floating axially independently of other engine members disposed in adjacent juxtaposition with the shroud segment in which:

the segment includes therein a shroud segment support wall surface extending generally axially into and at least partially through the shroud;

the shroud assembly includes a shroud hanger disposed in axial juxtaposition with the shroud segment, the shroud hanger including at least one support projection secured with the shroud hanger and extending generally axially from the shroud hanger into the shroud segment at the shroud segment support wall surface, the projection supporting the shroud segment releasably at the shroud segment support wall surface within the shroud segment, the shroud segment being movable axially on the projection independently of the shroud hanger and other engine members in adjacent juxtaposition with the shroud segment.

13. The turbine engine shroud assembly of claim 12 in which:

the shroud segment comprises a shroud segment body including a radially inner surface arcuate at least circumferentially, a radially outer surface, and at least one shroud segment support secured with the shroud segment body for carrying the shroud segment body, the segment support projecting generally radially outwardly from the shroud segment body radially outer surface, the shroud segment support including therein the shroud segment support wall surface extending generally axially into and at least partially through the segment support;

the shroud hanger being disposed in axial juxtaposition with the shroud segment support; and;

at least one support projection pin extending generally axially from the shroud hanger into the shroud segment support at the shroud segment support wall surface;

the support pin being secured with the shroud hanger and supporting the shroud segment releasably at the support wall surface within the shroud segment support across a clearance sufficient to enable relative axial movement of the shroud segment on the support pin, independently of the shroud hanger, responsive to generally axial pressure applied to the shroud segment during operation of the turbine engine.

14. The shroud assembly of claim 13 in which:

the shroud assembly includes a plurality of shroud segments disposed in circumferential juxtaposition;

the shroud segment support comprises at least one shroud segment support rib integral with and disposed circumferentially along the shroud segment body radially outer surface;

the shroud hanger comprises at least one hanger rib disposed in axial juxtaposition with the shroud segment support rib.

15. The shroud assembly of claim 14 in which the shroud segment support wall surface extends axially through the support rib to define therethrough an axial passage.

16. The shroud assembly of claim 14 in which:

the shroud segment support includes a plurality of axially spaced apart shroud segment support ribs each including a radially arcuate wall surface extending axially through the support rib to define therethrough an axial passage aligned axially with an axial passage of a spaced apart support rib; and, a support pin held by the hanger is disposed through each of the aligned passages through the shroud segment support ribs.

17. The shroud assembly of claim 14 in which:

the shroud segment support includes a plurality of axially spaced apart support ribs;

at least a first support rib comprising a plurality of spaced apart support rib segments aligned circumferentially to define the support rib;

the support rib segments being spaced apart circumferentially on the shroud segment body radially outer surface;

each rib segment including a support rib segment wall surface extending axially through the rib segment; and, a support pin held by the hanger disposed in juxtaposition with each support rib segment wall surface.

18. The shroud assembly of claim 17 in which the support rib segments are spaced apart circumferentially on the shroud segment body radially outer surface sufficiently to expose therebetween a portion of the shroud segment body radially outer surface.

19. The shroud assembly of claim 17 in which:

the shroud segment is made of a low ductility material having a low tensile ductility, measured at room temperature to be no greater than about 1%;

the shroud segment support wall surface extending axially into the shroud segment support rib is arcuate radially to define a shroud segment arcuate support surface;

the at least one support pin comprises an arcuate outer surface extending generally axially from the hanger rib into the shroud segment support rib at the shroud segment arcuate support surface;

the clearance being sufficient to enable the relative axial movement as well as relative thermal expansion and contraction of the support pin and the segment support rib between the support segment arcuate support surface and the support pin arcuate outer surface;

the spaced apart support rib segments of the first support rib being hook shaped rib segments each including a radially inner and arcuate support wall surface extending generally axially through the rib segment;

juxtaposed circumferentially spaced apart hook shaped rib segments facing circumferentially opposite one to the other exposing therebetween a portion of the shroud segment body radially outer surface.

20. The shroud assembly of claim 19 in which:

the shroud segment includes a second support rib spaced apart on shroud segment body radially outer surface axially aft of the first support rib;

the second support rib comprising a generally arch shaped rib segment extending circumferentially along shroud segment body radially outer surface;

the arcuate support surface of the second support rib segment defining a generally axial passage through the second support rib segment.

21. The shroud assembly of claim 20 in which:

the first support rib consists of a pair of the first support hook shaped rib segments, each including axially therethrough the radially inner arcuate wall surface;

the second support rib consists of one arch shaped segment axially aft on the shroud segment body radially outer surface of the first support rib and positioned generally axially aft and circumferentially between the pair of first support rib segments to define a triangle between the arcuate support wall surfaces of the first and second support rib segments, the support rib segment support wall surface of the second support rib defining an axial arcuate passage through the second support rib;

a first shroud hanger rib disposed in axial juxtaposition with the first support rib and carrying a pair of support pins respectively in juxtaposition with the radially inner arcuate wall surfaces of the pair of hook shaped rib segments; and, a second shroud hanger rib disposed in axial juxtaposition with the second support rib and carrying a support pin in juxtaposition with the support wall surface within the arcuate passage of the second support rib.

22. The shroud assembly of claim 14 in which:

the shroud segment is made of a low ductility material having a low tensile ductility, measured at room temperature to be no greater than about 1%;

the shroud segment support wall surface extending axially into the shroud segment support rib is arcuate radially to define a shroud segment arcuate support surface;

the at least one support pin comprises an arcuate outer surface extending generally axially from the hanger rib into the shroud segment support rib at the shroud segment arcuate support surface;

the clearance being sufficient to enable the relative axial movement as well as thermal expansion and contraction of the support pin and the segment support rib between the support segment arcuate support surface and the support pin arcuate outer surface.

23. The shroud assembly of claim 22 in which the low ductility material is a ceramic matrix composite material.

* * * * *